United States Patent
Herty et al.

(10) Patent No.: US 7,760,517 B2
(45) Date of Patent: Jul. 20, 2010

(54) CONVERTER FOR AN ION PROPULSION SYSTEM

(75) Inventors: Frank Herty, Markdorf (DE); Jochen Haegele, Friedrichshafen (DE)

(73) Assignee: Astrium GmbH, Munich (DE)

( * ) Notice: Subject to any disclaimer, the term of this patent is extended or adjusted under 35 U.S.C. 154(b) by 226 days.

(21) Appl. No.: 12/055,732

(22) Filed: Mar. 26, 2008

(65) Prior Publication Data
US 2008/0259645 A1    Oct. 23, 2008

(30) Foreign Application Priority Data
Mar. 27, 2007    (DE) ................ 10 2007 015 302

(51) Int. Cl.
*H02M 3/335* (2006.01)
*H02H 7/122* (2006.01)
(52) U.S. Cl. ............... 363/17; 363/58; 363/98; 363/132
(58) Field of Classification Search .......... 363/17, 363/58, 98, 132
See application file for complete search history.

(56) References Cited

U.S. PATENT DOCUMENTS

| | | | | |
|---|---|---|---|---|
| 4,276,588 A | * | 6/1981 | McLyman et al. | 363/24 |
| 4,661,897 A | | 4/1987 | Pitel | |
| 4,805,081 A | * | 2/1989 | Chambers et al. | 363/96 |
| 4,825,348 A | * | 4/1989 | Steigerwald et al. | 363/17 |
| 4,855,888 A | * | 8/1989 | Henze et al. | 363/17 |
| 5,132,889 A | * | 7/1992 | Hitchcock et al. | 363/17 |
| 5,198,969 A | * | 3/1993 | Redl et al. | 363/17 |
| 5,442,540 A | * | 8/1995 | Hua et al. | 363/98 |

FOREIGN PATENT DOCUMENTS

JP    2-87969 A    3/1990

OTHER PUBLICATIONS

Ivo Barbi, "Isolated DC-DC Converters with High-Output Voltage for TWTA Telecommunication Satellite Applications", IEEE Transactions on Power Electronics, Jul. 2003, pp. 975-984, vol. 18, No. 4.
Geoffrey N. Drummond et al., "Ion and Plasma Thruster Test Console Based on Three-Phase Resonant Conversion Power Modules", 42$^{nd}$ AIAA/ASME/SAE/ASEE Joint Propulsion Conference and Exhibit, Jul. 9-12, 2006, pp. 1-17, Sacramento, California, American Institute of Aeronautics and Astronautics, Inc.
S.H. Weinberg, "29-3: A New High-Efficiency Zero-Voltage, Zero-Current Switching Topology", pp. 1-2, European Space Agency, The Netherlands.

* cited by examiner

*Primary Examiner*—Bao Q Vu
(74) *Attorney, Agent, or Firm*—Crowell & Moring LLP

(57) ABSTRACT

A converter includes a converter for an ion propulsion system is provided. The converter includes a bridge circuit with a first and second bridge circuit connection and four switches. The converter also includes a storage inductance and a high voltage transformer with a primary and a secondary winding. The converter further includes a switch control unit, which opens or closes the fourth switch at a control time delayed in relation to the first switch.

18 Claims, 7 Drawing Sheets

CONVERTER FOR AN ION PROPULSION SYSTEM

CROSS REFERENCE TO RELATED APPLICATIONS

This application is claims priority under 35 U.S.C. §119 to German Patent Application No. 10 2007 015 302.5-32 filed Mar. 27, 2007, the entire disclosure of which is herein expressly incorporated by reference.

BACKGROUND AND SUMMARY OF THE INVENTION

The invention relates to a converter for an ion propulsion system.

Ion propulsion systems require electrical voltages in a range of several thousand volts in order to operate. Therefore, there is a need for power supplies that can achieve a high specific output and simultaneously exhibit high efficiency. In order to generate high voltages, the power supplies comprise converters that should exhibit, if possible, only a single converter stage in order to achieve the requisite high specific output while simultaneously continuing to exhibit high efficiency. If, however, a pre-regulator is dispensed with, it must be possible to control the single stage converter in its entirety. That is, when running with no load as well as under maximum load, the output voltage has to stay within the allowable limits.

In this case the propulsion systems do not constitute a purely resistive load. In gridless ion propulsion systems plasma variations may lead to periodic changes in the impedance. Gridded ion propulsion systems may develop discharges that result in transient shorts (beam out). Therefore, the anode current supply has to be insensitive to changes in the impedance of the propulsion system. Furthermore, it is generally necessary to electrically isolate the low voltage side from the high voltage side. As a result, a transformer has to be used. However, the high transformation makes it necessary to take the winding capacitance of said transformer into special consideration.

The prior art converters for ion propulsion systems employ two stages. The first stage comprises a pre-regulator, which does not exhibit electrical isolation and which generates a variable intermediate circuit voltage and a variable intermediate circuit current. The second stage is an unregulated stage for electrical isolation and for raising to the required voltage value. The unregulated stage is designed as a full resonant mode bridge circuit or as a push-pull stage. In both cases zero voltage switches and zero current switches (ZVS: zero voltage switching and ZCS: zero current switching) are used.

The publication "Isolated DC-DC Converters With High-Output Voltage for TWTA Telecommunication Satellite Applications," Ivo Barbi, Roger Gules, IEEE Transactions on Power Electronics, Vol. 18, No. 4, July 2003, introduces a single stage design as a further development of the pull-push stage. In this case, however, the large storage choke of the prestage is maintained.

Another single stage design, which is based on a three phase, fully resonant converter, is introduced in the publication "Ion and Plasma Thruster Test Console Based on Three-Phase Resonant Conversion Power Modules," Geoffrey N. Drummond, John D. Williams, 42nd AIAA/ASME/SAE/ASEE Joint Propulsion Conference & Exhibit, Jul. 9-12, 2006, Sacramento, Calif. However, full resonant mode converters can be controlled only by detuning the switching frequency within certain limits.

In the publication "A New High-Efficiency Zero-Voltage, Zero-Current Switching Topology," S. H. Weinberg, European Space Agency, TEC-EPC, Postbus 299, 2200AG Noordwijk, The Netherlands, a push-pull stage with quasi resonant switching is used as the main transformer and operates with ZVS/ZCS. In order to expand the control range, a smaller converter of the same type varies the primary voltage of the main converter. As a result, the ZVS/ZCS operating mode is maintained over a larger adjustment range.

The common feature of all of the solutions lies in the compatibility with the winding capacitance of the high voltage transformer. Therefore, designs exhibiting a secondary-sided current smoothing are eliminated.

Exemplary embodiments of the present invention provide an improved converter, which can be employed for ion propulsion systems. In particular, the present invention converts the voltage with a converter. The present invention permits a high transformation ratio and, nevertheless, offers a simple and, thus, easy as well as economical possibility for adjusting the load current without having to be concerned about a high ripple of the output voltage.

The present invention is based on the recognition that it is possible to achieve a conversion of the voltage using a precise, but simultaneously simple adjustment of the load current in that the necessary circuit engineering measures are implemented in the primary and secondary circuit of the converter, and that the (high) capacitance of the secondary winding, necessitated by the high transformation ratio, cannot exert any negative influence on the voltage conversion. In addition, a time delayed opening and/or closing of the switches inside the bridge circuit allows the resulting current paths to divide cyclically and conjoin again and the coupling point to be adjusted using the time lag in opening and/or closing the switches of the bridge circuit. Since, however, this coupling point acts directly on the current amplitude, which occurs during the steady state mode of the voltage conversion, the amount of the high voltage generated during the voltage conversion can also be indirectly controlled by adjusting the coupling point.

Thus, the present invention offers the advantage that, in contrast to the state of the art, simple engineering means make possible a good controllability of the load current while simultaneously continuing to exhibit a high voltage transformation ratio. Moreover, at the same time, in addition, a reaction to the impedance variations in the supplied load can still ensue with an adequate matching to the power to be transmitted. Furthermore, the matching to the power to be transmitted is realized only in a recharging operation during a switch-over operation of the converter so that there is almost no need to change the pulse duty factor. Thus, the required ripple of the current, which is consumed by the converter, and the required ripple of the load current can be achieved with relatively low filtering complexity, even though the switching frequency can be set low (a feature that helps to reduce the frequency dependent losses in the filtering components or storage chokes).

One embodiment of the invention provides a converter for an ion propulsion system. The converter includes a bridge circuit with a first and second bridge circuit connection and with two bridge branches, the bridge circuit comprising four switches, each having a first and second connection, the first connection of a first and third switch respectively being connected to the first bridge circuit connection; the second connection of the first switch being connected to the first connection of a second switch; the second connection of the third switch being connected to the first connection of a fourth switch; and the second connection of the second and fourth switch respectively being connected to the second bridge circuit connection.

The converter also includes a storage inductance and a high voltage transformer with a primary and a secondary winding, the primary winding and the storage inductance being connected in series; and this series connection being connected to the second connection of the first switch and the second connection of the third switch; and the secondary winding being connected to an output of the converter.

The converter further includes a switch control unit, which is designed to drive switches inside a bridge branch in such a manner that a delay time is inserted between the switch-over process in order to prevent a bridge short circuit and in order to be able to carry out the switching operations under zero voltage conditions or lowest voltage.

Furthermore, this switch control unit is designed to open or close-so as to be time delayed in relation to a switch of the second bridge branch-a switch of the first bridge branch at a control time.

According to a further development of the invention, an auxiliary inductance is connected between the primary winding and the second connection of the third switch.

As an alternative or in addition to providing the auxiliary inductance, a further embodiment of the invention may provide the converter with a diode branch, comprising two diodes. In this case the cathode of the first diode is connected between the primary winding of the high voltage transformer of the auxiliary inductance; and the anode of the first diode is connected to the second bridge circuit connection. The cathode of the second diode should be connected to the first bridge circuit connection; and the anode of the second diode should also be connected between the primary winding and the auxiliary inductance. This embodiment is provided for the case, where MOSFET transistors are used as the switches. Then the body diode of these switches is not operated in the hard switching mode, for which reason it is possible to avoid a failure of the converter.

Furthermore, in one embodiment of the invention, one capacitance respectively may also be connected between the first and second connections of the second and fourth switch. As a result, the voltage load can be kept advantageously low at all four switches during the turn-on operation (zero voltage switching), so that the turn-on losses may be kept as low as possible.

Furthermore, in another embodiment of the invention, one diode respectively may be connected between the first and second connections of all switches, if the switch design that is used does not exhibit any inherent diode, the anode of which is connected to the first connection and the cathode of which is connected to the second connection of the respective switch.

In another embodiment of the present invention, a capacitance may be connected in parallel to the secondary winding of the high voltage transformer. This feature makes it possible to avoid undershooting a secondary-sided minimum capacitance, which is necessary for a resonant recharging of the inductances and for the intermediate accumulation of energy.

According to another embodiment of the invention, the switch control unit may be designed to determine the control time in such a manner that it corresponds to no more than one-tenth of the period of time that elapses between an opening and closing of the same switch. This feature guarantees that the pulse duty factor is as high as possible and, moreover, does not change significantly so that the high voltage transformer generates almost square wave current pulses, so that the current waveform, resulting after rectifying, exhibits an advantageously low harmonic factor and an advantageously short gap time. Therefore, the harmonic factor is relevant for the resistive losses; and the gap time is relevant for the current ripple and the associated filtering complexity.

Furthermore, another embodiment of the invention also provides a switch control unit that is designed to use—in the event of a repeated opening of the fourth switch upon opening a first switch—a control time that is different from the preceding opening of the fourth switch. This feature makes it possible to use different control times when the converter is in operation. Therefore, these different control times also make it possible to transmit different power outputs by way of the converter. Other advantages and possible applications of the present invention may be derived from the following description in conjunction with the embodiments, depicted in the drawings.

Other objects, advantages and novel features of the present invention will become apparent from the following detailed description of the invention when considered in conjunction with the accompanying drawings.

BRIEF DESCRIPTION OF THE DRAWINGS

The description, the claims, the abstract and the drawings include the terms and associated reference numerals and symbols that are cited in the attached list of reference numerals and symbols.

DETAILED DESCRIPTION OF THE DRAWINGS

Figure 1:
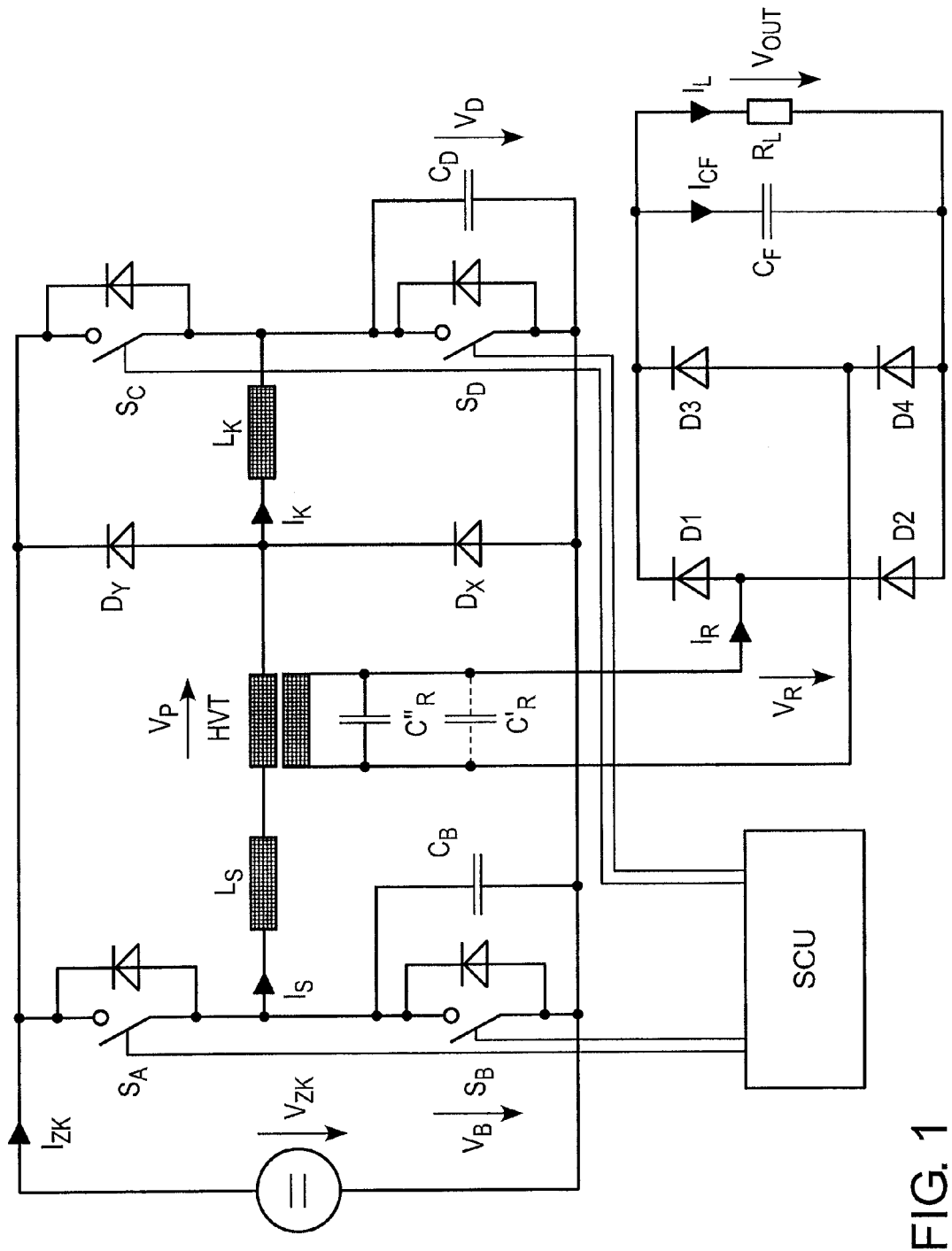
FIG. 1 is a block diagram of one embodiment of the inventive converter, depicted as a design alternative with a bridge rectifier in the secondary branch.

The same and/or functionally identical elements are provided below with the same reference numerals and symbols. The absolute values and measurements that are cited below constitute exemplary values and do not restrict the invention to such dimensions.

As FIG. 1 shows, the converter, according to one embodiment of the present invention, includes an H bridge and an additional diode branch. A high voltage transformer is connected between the left branch $S_A$, $S_B$ and the diode branch $D_X$, $D_Y$. The storage choke $L_S$ is situated in series with respect to the primary winding. Another storage choke $L_K$ is connected between the diode branch and the right branch of the bridge $S_C$, $S_D$. The ZVS capacitors $C_B$ and $C_D$ (ZVS=zero voltage switching) are situated parallel to the switches $S_B$ and $S_D$.

The high voltage transformer HVT raises the intermediate circuit voltage $V_{ZK}$ to the required value and provides for electrical isolation. The transformation ratio of the transformer is chosen in such a manner that it corresponds to the ratio of the (nominal) intermediate circuit voltage $V_{ZK}$ and the output voltage $V_{OUT}$. The winding capacitance of the high voltage transformer is modeled by a concentrated component $C_R''$. Since this capacitance may not drop below a minimum value, it may be necessary to add an external capacitance ($C_R'$), so that the result is the resulting capacitance $C_R$. The two branches of the bridge are controlled in such a manner that the upper switch and the lower switch are closed alternatingly and for a period of time that is approximately the same. Each switch remains closed within a switching cycle, in each case approximately 50% of the cycle time, minus a lag time. Therefore, the switch control unit SCU is configured in such a way that it can switch the switches $S_A$, $S_B$, $S_C$ and $S_D$ individually and at defined time intervals in relation to each other.

The adjustment of the output current is achieved by controlling the right bridge branch C-D in such a manner that all of the edges of the control signal of both switches lag by a defined time $t_c$ in relation to the signal edges of the branch A-B. The time shift is referred to below as the control time $t_c$. In this case the control time $t_c$ is only a fraction of the total duration of one switching cycle—that is, the duration of a period that is defined by the switching frequency and, consequently, has only a slight effect on the pulse duty factor of the transformer current.

Figure 2:
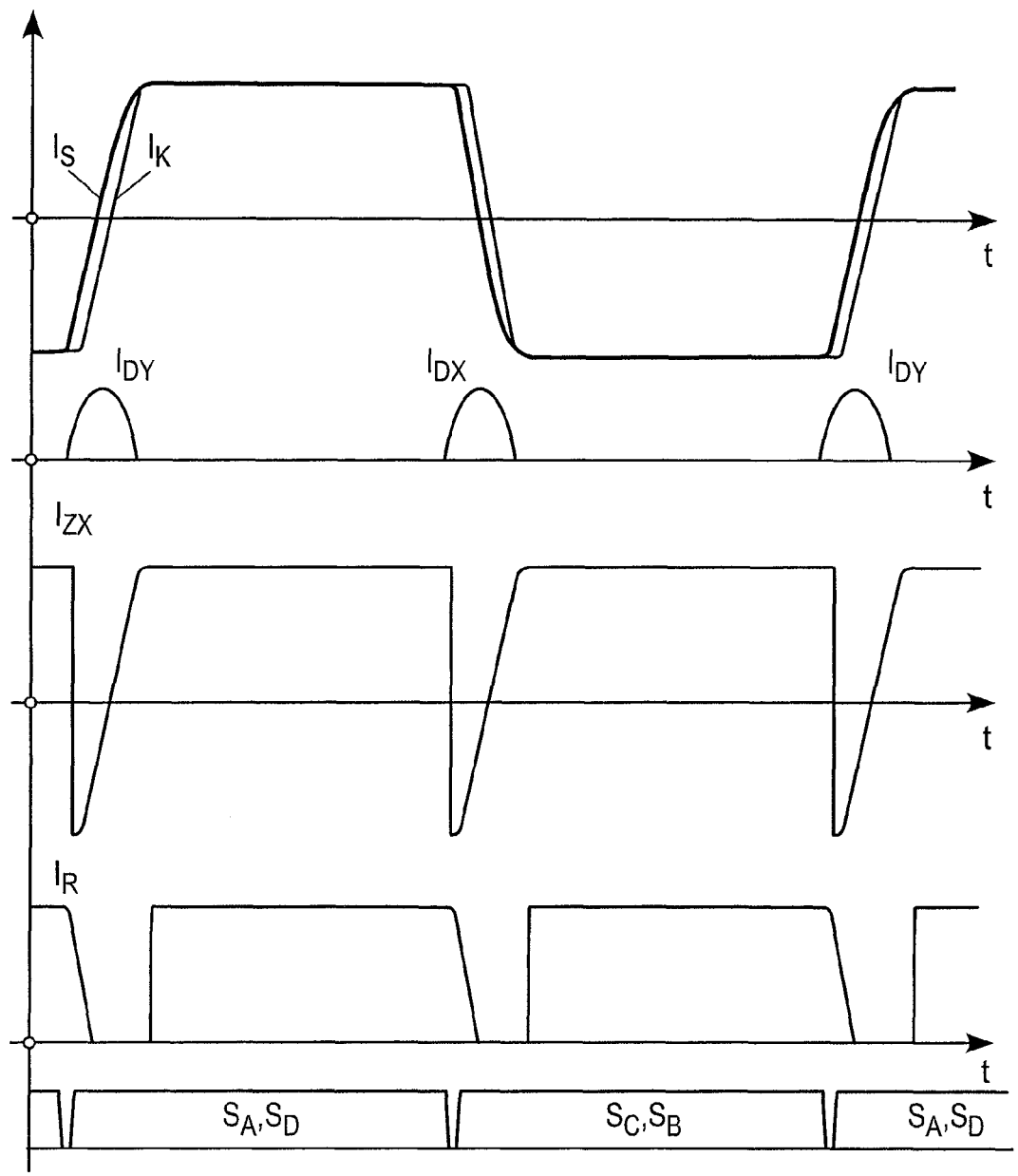
FIG. 2 is a diagram of various current waveforms, depicted in FIG. 1, over the time.

The properties of the converter are characterized in that in the steady state operation the amplitudes of the primary and secondary currents of the high voltage transformer change only slightly during the energy transmission periods. Therefore, the result is an almost square waveform of the current, as depicted in FIG. 2. Furthermore, there is a clear correlation between the current amplitude and the control time $t_c$—a feature that will be explained below in detail. Thus, the current amplitude can be re-adjusted for each switching cycle by changing the control time.

The change-over from the positive to the negative half-cycle of the current is based on resonant reversal processes. Consequently, the power switches can be closed at a voltage minimum, where in the case of medium and high load currents this minimum is zero, and in the case of low load currents this minimum is a fraction of the intermediate circuit voltage.

In principle, these functions could also be achieved without the additional diode branch, which is depicted in FIG. 1, and without $L_K$. However, within the switch-over operation between the positive and the negative half-cycle of the primary transformer current, the situation would develop that the diodes of the branch ($S_C$, $S_D$) would switch hard. The sudden buildup of the blocking voltage may result in a high reverse current, especially if MOSFETS are used as the switches and their (slow) body diode is utilized. The reverse current may cause the component to fail.

Both the input current and the output current consist of consecutive square wave or square wave-like current pulses. The filtering stages at the input and the output have to be configured only with respect to the comparatively narrow gaps between the pulses. For the same reason the amplitude as well as the ripple of the currents do not increase, even if the switching frequency is decreased.

Even though as the switching frequency becomes less, a larger transformer core has to be accepted, the filter components and the chokes $L_S$ and $L_K$ do not have to be redesigned. Therefore, it is desirable for the switching frequency to be as low as possible, because in this way the eddy current losses in the magnetic components (proximity effect) may be significantly reduced.

The following description of the embodiment of the present invention that is depicted in FIG. 1 assumes ideal switches and rectifier diodes for the purpose of simplifying the following description.

The energy source (intermediate circuit) is connected to the drain (load circuit) by way of one storage choke or a plurality of storage chokes that are connected in-between. During the transmission of energy a current flows from the source to the drain. In so doing, a portion of the energy is stored in the chokes (i.e., the inductances). The remaining energy is transmitted to the load. During the switch-over operations, a portion of the energy, which is stored in the chokes, is transmitted into the load and the rest is transmitted back into the source. The direction of the current is switched over twice per switching cycle by means of the bridge circuit.

In the first half of the switching cycle, when the energy is transmitted, the current path runs via the switch $S_A$ and via the series connection, consisting of the storage choke $L_S$, the transformer primary winding and the auxiliary choke $L_K$. The diodes $D_X$ and $D_Y$ do not carry any current.

The switch $S_D$ closes the current circuit. In the second half of the switching cycle, the path runs correspondingly via $S_C$ and $S_B$.

On the secondary side the current flows by way of the rectifier to the output filter. In so doing, the output voltage is mapped (reflected) on the primary side of the transformer. At this point the transformation ratio of the transformer is selected, if possible, in such a way that the reflected output voltage matches as precisely as possible the intermediate circuit voltage.

Therefore, the design of the transformation ratio must also consider the voltage situations of the diodes, the switches and the feed lines.

During the transmission of energy the intermediate circuit voltage and the reflected output voltage compensate for each other so that no voltage differences remain across the chokes $L_S$ and $L_K$. Consequently the current cannot change owing to $L_S$ and $L_K$; and the result is, therefore, the horizontal segment of the current waveform, which is depicted in FIG. 2.

If the intermediate circuit voltage or the output voltage changes, this state of equilibrium can no longer be maintained. The horizontal segment of the current waveform becomes a ramp. This feature will be explained in detail below in a section that follows.

The circuit states include the respective states of the power switches ($S_A$ to $S_D$), the charge states of the energy accumulator as well as the resulting current paths of the circuit. The circuit states remain in existence for a defined period of time within a switching cycle. These time periods are referred to below as the sections.

Derivation of the Differential Equations

Figure 3:
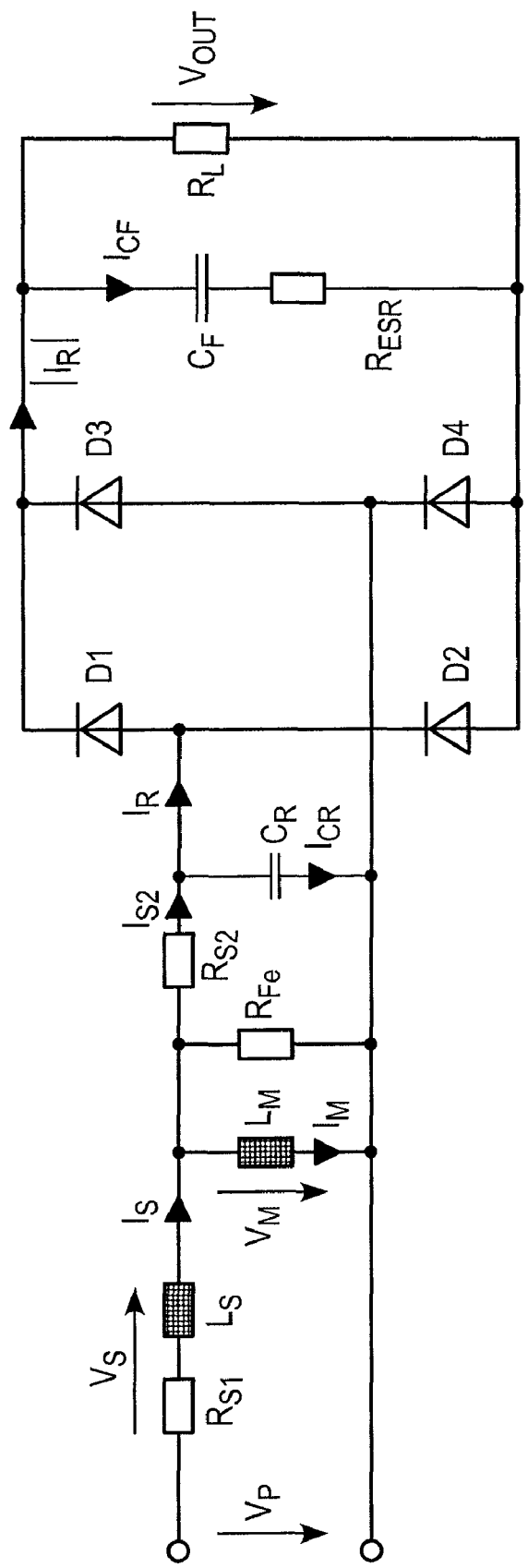
FIG. 3 is an equivalent circuit diagram of the output circuit of the embodiment of the inventive converter that is depicted in FIG. 1.

FIG. 3 is an equivalent circuit diagram, by which the related differential equations can be derived from the circuit states. Therefore, only those parts of the circuit that lie in the respective current path have to be taken into consideration.

Figure 4:
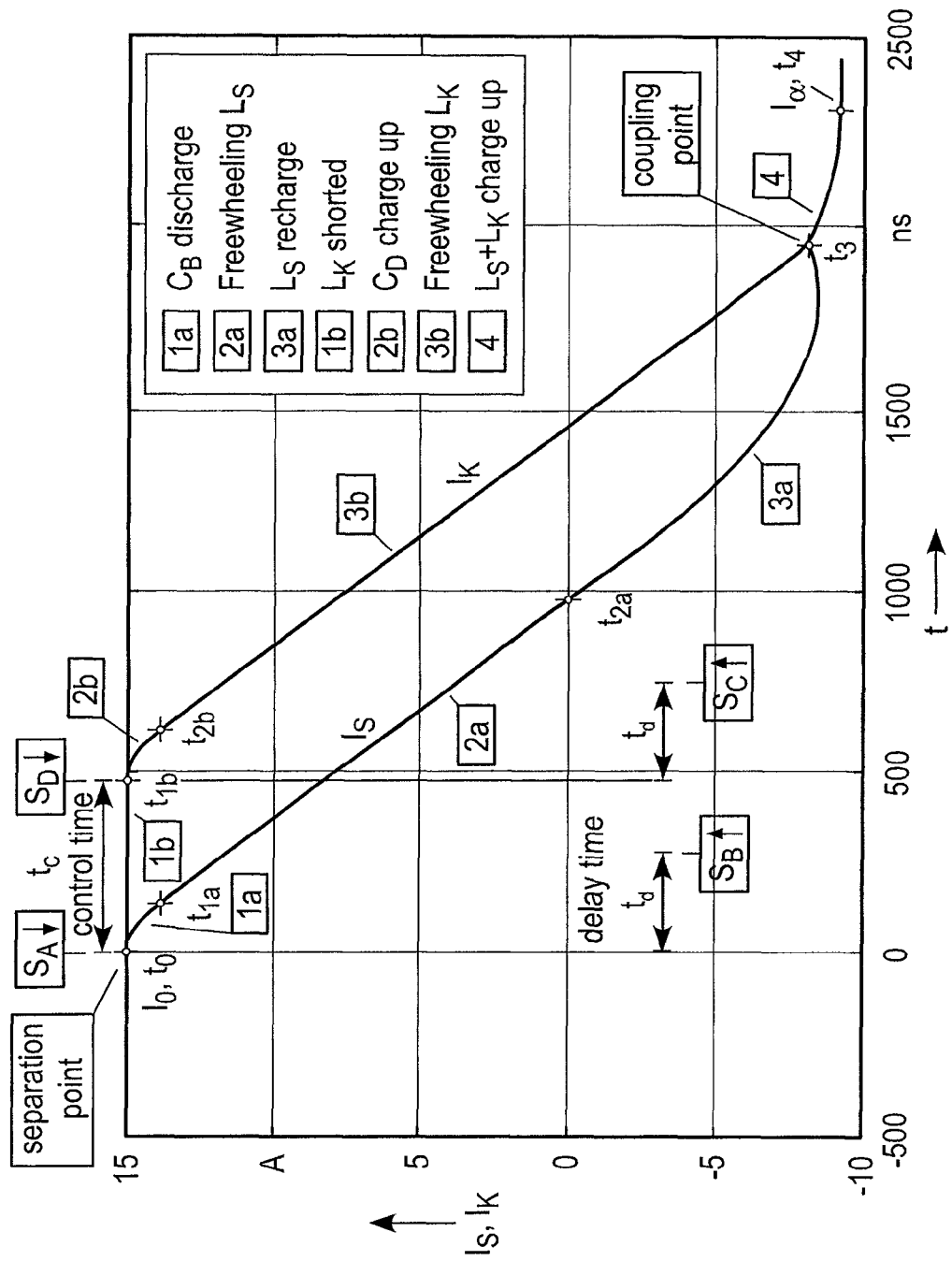
FIG. 4 is a diagram of a commutation waveform for the embodiment of the inventive converter that is depicted in FIG. 1.

As shown in the embodiment, depicted in FIG. 1, and as depicted in detail in FIG. 4, the current and voltage waveforms of all of the components of the converter may be generated from the section by section solutions of these differential equations. The waveforms are assembled section by section, the end values of the preceding section serving as the initial values for the solution of the differential equation of the next section. For symmetry reasons only the first half of the switching cycle will be examined below. Furthermore, all values relate to the primary side.

The ohmic resistances of the transformer windings, the secondary-sided scattering and the core losses have only a negligible effect and are, therefore, not considered.

Section 1a

The section 1a that is depicted in FIG. 4 starts with the opening of the switch $S_A$, an operation that is indicated with the symbol $S_A\downarrow$. This operation initiates the change-over from the positive to the negative half-cycle of the primary transformer current and, thus, also of the choke current $I_S$. In this case the choke current $I_S$, which existed immediately before the beginning of this section, is used as the first initial value.

As a result of $L_S$, the current decreases. At this point, instead of the voltage source, the energy, stored in the capacitor $C_B$, continues to drive the current. Since the rectifier diodes still conduct on the output side, the energy is transferred from $L_S$ and $C_B$ to the output side.

As soon as $C_B$ is totally discharged (that is, $V_B=0$), the current is commutated to the freewheeling diode of $S_B$, thus, ending section 1a.

Section 1a: discharge $C_B$ until $V_B=0$
Reference time $t_0$ End of section $t_{1a}$ Current:

$$I_s(t) = \frac{V_{ZK} - V_{out}}{\omega \cdot L_S} \cdot \sin(\omega t) + I(t_0) + \cos(\omega t)$$

Voltage:

$$V_B(t) = V_{ZK} - (V_{ZK} - V_{OUT})(1 - \cos(\omega t)) - \frac{I(t_0)}{\omega \cdot C_B} \cdot \sin(\omega t)$$

Parameter:

$$\omega := \frac{1}{\sqrt{L_S \cdot C_B}}$$

Section 2a

Section 2a follows section 1a and describes the entire freewheeling of $L_S$. The current path for the freewheeling current runs by way of the primary winding of the transformer to the diode $D_X$ and continues to run to the diode of the switch $S_B$. Therefore, the diode $D_X$ is kept in a conducting manner by the larger current $I_K$. Only the reflected output voltage $V_{OUT}$ appears as the counter-voltage. The result is a linear decrease in the choke current. The transmission of energy to the secondary side also terminates with this section.

Section 2a: freewheeling of $L_S$ counter to $V_{OUT}$ until $I_S=0$
Reference time $t_{1a}$ End of section $t_{2a}$ Current:

$$I_s(t) = I_s(t_{1a}) - \frac{V_{OUT}}{L_S} \cdot t$$

Section 3a

Section 3a begins with the zero passage of the current $I_S$. The diodes of the output rectifier block; and the auxiliary capacitor $C_R$ and/or $C_R'$ is/are charged up to the output voltage. At this point a resonant reversal process, in which the elements $L_S$ and $C_R$ are involved, starts.

The current path for $I_S$ runs by way of the diode $D_X$, which is forward conducting owing to the still positive current $I_K$. Furthermore, the current $I_S$ flows by way of the switch $S_B$, which is already closed at the beginning of this section—i.e., automatically closes following a lag time $t_d$ after opening the switch $S_A$ (indicated with the symbol $S_B\uparrow$ in FIG. 4). As a result, the resonance circuit consists of $L_S$ and the capacitance $C_R$, converted to the primary side.

The reversal process begins with the IS building up in the negative direction. At the same time, the choke current IK continues to decrease and becomes negative (see section 3b). As soon as both currents IS and IK become the same size, the diode DX ceases to conduct. At this point both currents are coupled. The result is a new current path by way of the switches SC and SB for the common current IS=IK. Consequently the resonant reversal process is terminated. The sections 3a and 3b end at this coupling point.

Section 3a: $L_S$ charge exchange with the capacitor voltage $V_R$ until $I_S=I_K$
Reference time $t_{2a}$ End of section $t_3$
Current:

$$I_s(t) = \frac{V_{OUT}}{\omega \cdot L_S} \cdot \sin(\omega t)$$

Voltage:

$$V_R(t) = V_{OUT} \cdot \cos(\omega t)$$

Parameter:

$$\omega := \frac{1}{\sqrt{L_s \cdot C_R}}$$

Section 4

After the currents $I_S$ and $I_K$ are coupled, section 4 starts. Even though the switches $S_C$ and $S_B$ are already closed, no energy has been transmitted yet to the output, because the diodes of the output rectifier cannot conduct yet. Then the energy flows from the voltage source $V_{ZK}$ into the capacitor $C_R$, which could not be totally recharged yet owing to the interrupted reversal process. At this point the recharging process is continued.

Section 4 ends with the capacitor $C_R$ being completely charged up to the negative value of the output voltage.

Section 4: charge up $C_R+L_S$ with $V_{ZK}+V_R$ until $V_R=V_{OUT}$
Reference time $t_3$ End of section $t_4$
Current:

$$I_s(t) = -\frac{V_{ZK} + V_R(t_3)}{\omega \cdot (L_S + L_K)} \cdot \sin(\omega t) + I_S(t_3) \cdot \cos(\omega t)$$

Voltage:

$$V_R(t) = -(V_{ZK} + V_R(t_3)) \cdot (1 - \cos(\omega t)) + \frac{I_S(t_3)}{\omega \cdot C_R} \cdot \sin(\omega t) + V_R(t_3)$$

Parameter:

$$\omega := \frac{1}{\sqrt{(L_S + L_K) \cdot C_R}}$$

Section 1b

Section 1b also begins with the opening of the switch $S_A$ (an event that is indicated with the symbol $S_A\downarrow$ in FIG. 4). $L_S$ has no counter-voltage and, consequently, holds the current constant. The current path runs by way of the diode $D_X$ and the switch $S_D$. Therefore, section 1b ends with the opening of the switch $S_D$ (an event that is indicated with the symbol $S_D\downarrow$).

Section 1b: freewheeling $L_K$
Reference time $t_0$ End of section $t_{1b}$
Current $I_K = I_S(t_0)$ Section 2b Section 2b follows section 1b. It begins with the elapse of the control time—that is, with the opening of the switch $S_D$. Consequently at this point then the choke current $I_K$ flows through the capacitor $C_D$. This capacitor charges itself up until the capacitor voltage $V_D$ has reached the value of the intermediate circuit voltage. At this point section 2b ends.

Section 2b: charge up $C_P$ until capacitor voltage $V_D = V_{ZK}$
Reference time $t_{1b}$ End of section $t_{2b}$
Current:

$$I_K(t) = I_S(t_0) \cdot \cos(\omega t)$$

Voltage:

$$V_D(t) = \frac{I_S(t_0)}{\omega \cdot C_D} \cdot \sin(\omega t)$$

Parameter:

$$\omega := \frac{1}{\sqrt{L_K \cdot C_D}}$$

Section 3b

As soon as the capacitor $C_D$ is totally charged, section 3b begins. The freewheeling path of $I_K$ consists of the diode of the switch $S_C$, the voltage source $V_{ZK}$ as well as the diode $D_X$. The freewheeling of the choke $L_K$ counter to the voltage source $V_{ZK}$ effects a linear decrease in the choke current.

At this point the actuation of the switches is configured in such a manner that the switch $S_C$ is closed no later than at zero passage of the choke current $I_K$. (In FIG. 4 the closing of the switch $S_C$ after a lag time $t_d$ upon opening the switch $S_D$ is indicated with the symbol $S_C\uparrow$). Consequently $I_K$ can build up again linearly in the reverse direction. In this case the current path does not change. At the time of the zero passage of $I_K$, the choke current $L_S$ is already negative (see section 3a). As long as $I_S$ stays more negative than $I_K$, the difference between the currents has to flow through $D_X$. In this way the diode $D_X$ remains conducting in the forward direction.

Owing to the resonant reversal process, the currents $I_S$ and $I_K$ approach each other. At the coupling point both currents are the same size. The diode $D_X$ goes into the blocking state. Thus, section 3b ends.

Section 3b: recharge $L_K$ with $V_{ZK}$ until $I_S = I_K$
Reference time $t_{2b}$ End of section $t_3$
Current:

$$I_K(t) = I_K(t_{2b}) - \frac{V_{ZK}}{L_K} \cdot t$$

Current Waveform During Commutation

The composite waveform of the choke currents $I_S$ and $I_K$ is obtained by placing the individual segments of the waveforms in a row, as depicted in FIG. 4.

Both currents are identical up to the separation point. Due to the control time, IK decreases no later than IS. The difference between both currents flows through the diode branch. Both currents conjoin again at the coupling point. The commutation is terminated, when the transmission of energy ensues—that is, when the output rectifier become conductive. This occurs at the time $t_4$.

At this point the new initial value of the transformer current $I_S$ may be selected at the control time $t_c$. This initial value is called the knee point current $I_\alpha$ since it marks the transition from the steep current edge of the commutation process to the flat segment of the transformer current.

The influence of the control time is as follows. Increasing the control time $t_c$ has the effect that the coupling of the currents $I_S$ and $I_K$ also takes place at a later time. Therefore, the resonant reversal process (section 3a in FIG. 4) is not terminated until later. If one imagines that the waveform from section 3a continues, then the coupling point shifts closer to the zero line. In so doing, the transmission of energy also begins with a knee point current that is lower in terms of amount. If, in contrast, the control time is selected so as to be smaller, the initial value increases.

Relationship Between the Control Time and the Transformer Current

The relationship between the control time and the initial value $I_\alpha$ is obtained numerically by repeatedly calculating the commutation current waveform for the various control times tc. The time functions of the individual sections show that the following parameters may influence the initial value.

preceding knee point current:

$$I_S = \left(t_0 - \frac{T}{2}\right)$$

intermediate circuit voltage: Vzk
(reflected) output voltage: Vout
The waveforms of the choke currents $I_S$ and $I_K$ show that the preceding initial value has no influence on the new initial value. Up to the zero passage both curves are almost identical; there is only a time shift. However, this time shift is not influenced by the initial value. For this reason the current amplitude at the coupling point is also unaffected.

Figure 5:
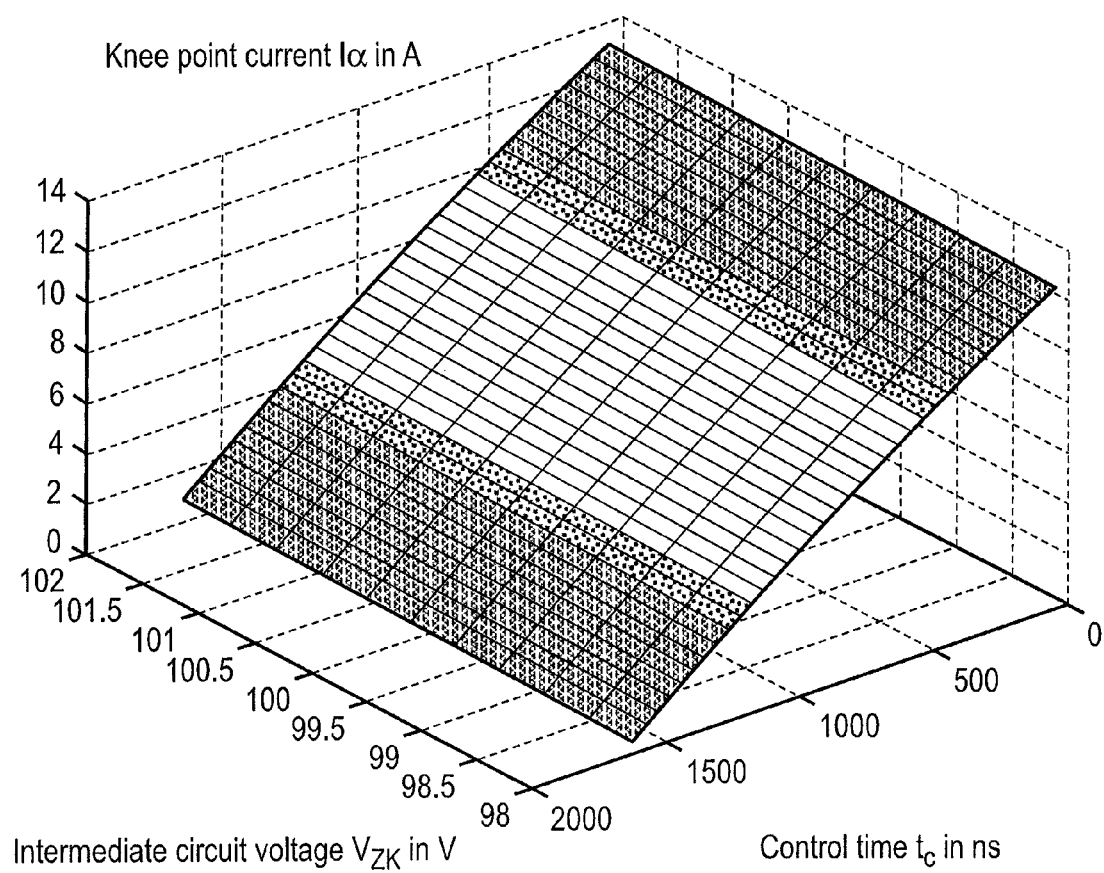
FIG. 5 is a diagram of the family of characteristic control curves in connection with the embodiment of the present invention that is depicted in FIG. 1.

Since $L_S$ freewheels counter to the reflected output voltage, but $L_K$ freewheels counter to the intermediate circuit voltage, the knee point current $I_\alpha$ is affected in essence by the difference between these voltages. If $I_\alpha$ is plotted over the control time and the intermediate circuit voltage as the second parameter, the family of characteristic control curves of the converter for a given output voltage is obtained (a state that is depicted in detail in FIG. 5).

The above description relates in particular to the changeover of the currents $I_S$ and $I_K$ from the positive to the negative half-cycle. During a change-over the procedure is in the inverse direction—that is, during the change-over to the positive half-cycle analog.

Control Model of the Converter

If the output voltage changes, for example, by a sudden load variation, then during the transmission of energy the difference between the intermediate circuit voltage and the reflected output voltage decreases by way of the chokes $L_S$ and $L_K$. If, for example, the output voltage decreases, this difference is positive. Therefore, during the transmission of energy the current increases linearly. Hence, the result is an additional current-time area (see FIG. 6b).

Figure 6A:
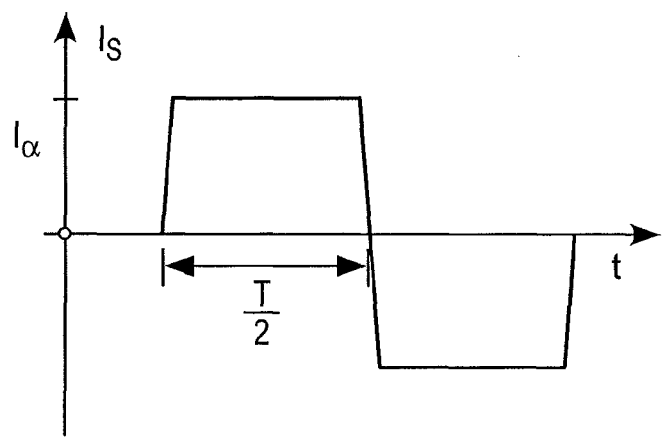
FIG. 6 is a diagram illustrating the effect of the output voltage on the transformer current in connection with the embodiment that is depicted in FIG. 1.
Figure 6B:
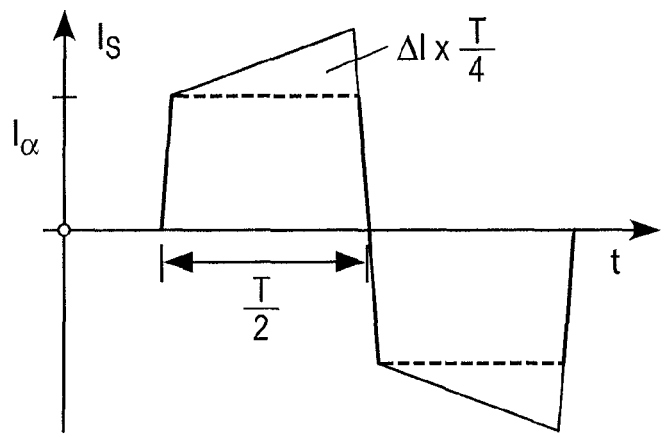
Figure 6C:
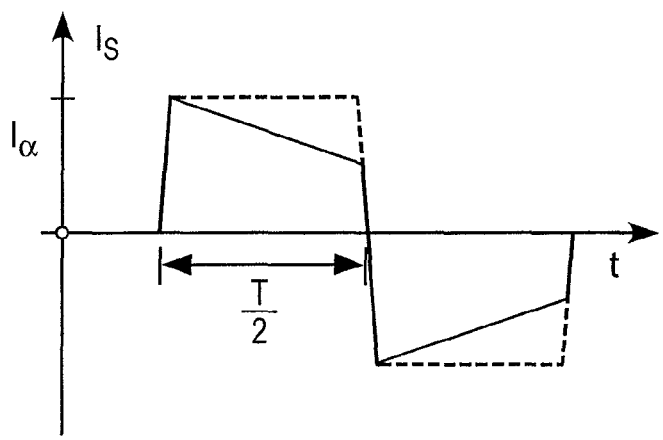

Consequently more energy is transferred to the output, so that the output voltage will increase again. In the inverse case the current-time area is reduced, when the output voltage is too high (see FIG. 6c). In contrast, FIG. 6a illustrates the case, where the output voltage and the intermediate circuit voltage are the same size.

However, a change in the intermediate circuit voltage will also result in a change in the current-time area. In this case the converter reacts in such a way that the output voltage always tracks the intermediate circuit voltage.

The medium sized current through the rectifier within an energy transmission intervals can be calculated as:

$$\bar{I}_R = D \cdot I_a + \frac{T}{4} \cdot \frac{V_{ZK} - V_{OUT}}{L_S + L_K}, \quad T = \frac{1}{f_S}$$

For the sake of simplification all of the values relate to the primary side of the transformer. Hence, T is the duration of a complete switching cycle at the switching frequency $f_s$; and D is the pulse duty factor of the current pulse, where the duration of the negative and positive pulses are considered cumulatively.

Furthermore, the dynamic behavior of the output filter in the Laplace region may be described as follows.

$$V_{OUT} = \frac{1}{s \cdot C_F} \left[ \bar{I}_R - \frac{V_{OUT}}{R_L} \right]$$

If at this point the virtual resistance is entered $$R_M := 4 \cdot f_s \cdot (L_S + L_K),$$

then the results for the output voltage are $$V_{OUT} = \frac{1}{s \cdot C_F} \left[ D \cdot I_a + \frac{V_{ZK}}{R_M} - \frac{V_{OUT}}{R_M} - \frac{V_{OUT}}{R_L} \right]$$

Figure 7:
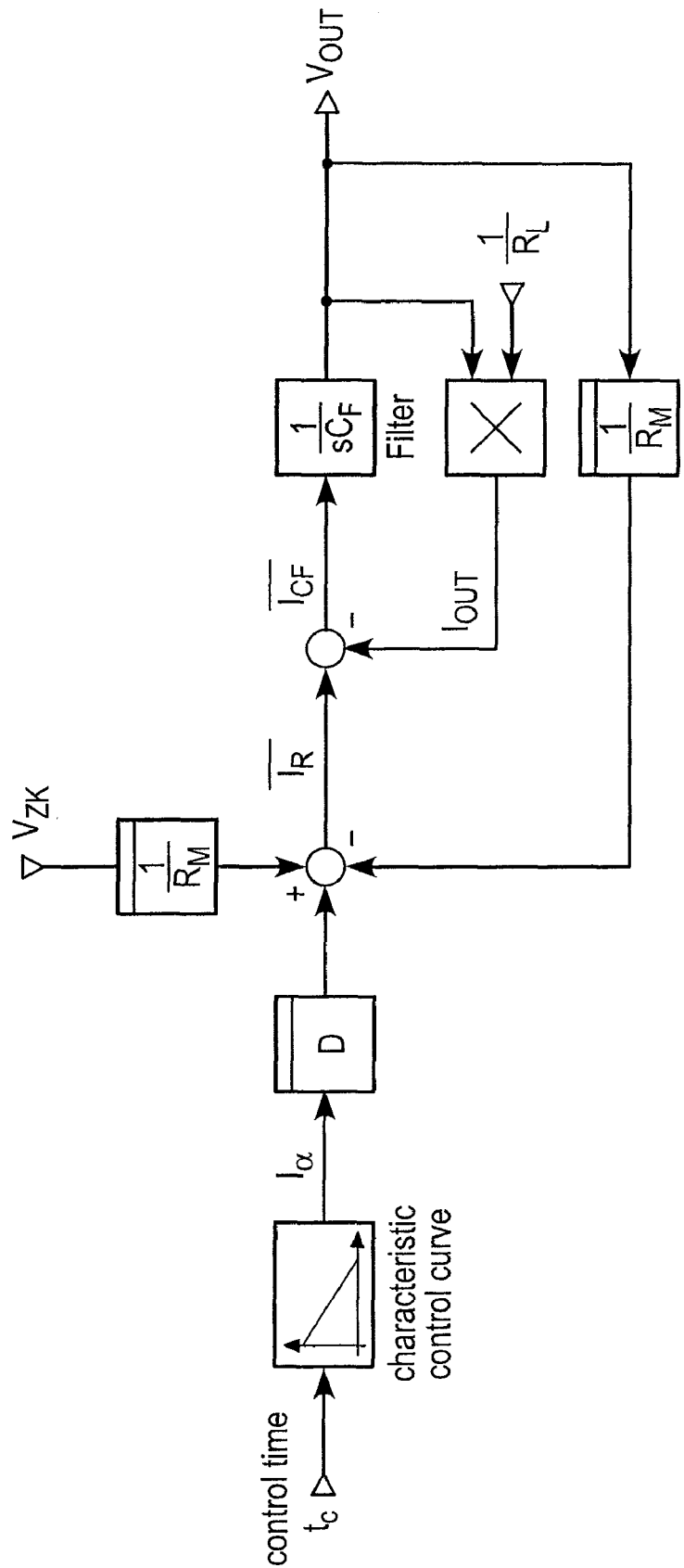
FIG. 7 is a control-related block diagram of the embodiment of the inventive converter that is depicted in FIG. 1.

From this equation the model—that is, the pattern image for the dynamic behavior of the converter—can be derived, as depicted in FIG. 7. Since the model is based on the values which have been averaged within an energy transmission interval, it applies to frequencies of up to about one-fourth of the switching frequency.

In this case the resistance $R_M$ acts in such a manner that it is connected parallel to the load resistance $R_L$. By dimensioning $L_S$, $L_K$ and $f_S$ it is possible to achieve that $R_M$ is significantly less than the minimum allowable load resistance, which is established by the power limits of the converter. $R_M$ may be configured, for example, one order of magnitude less than $R_L$.

In this case there is virtually no longer any change in the pole of the capacitive output filter, since not only the (known) filter capacitance $C_F$ but also the parallel connection of $R_M$ and $R_L$ (and not $R_L$ alone) are relevant for the position of the pole. In this case the controlled system becomes almost load independent. Therefore, the pole may be compensated simply by a zero point in the transmission function of the controller.

In contrast to the known flux converter principle, the storage chokes $L_S$ and $L_K$ do not generate any poles or zero points in the controlled system, since their charge state is reset with every transmission of energy. Thus, there is no need to eliminate the poles and zero points with the aid of an underlying current mode control.

In summary the dynamic behavior of the converter can be characterized as follows:

The converter is insensitive to load variations;

The converter passes any change in the intermediate circuit voltage to the output; and An underlying current mode control is not necessary.

In summary it must be pointed out that the present invention describes a converter principle that may be tailored, in particular, to electrical ion propulsion systems, which require a high voltage in a magnitude of several thousand volts in order to operate. (That is, the high voltage transformer exhibits a transformation ratio of, for example, 1:20). The converter principle permits the output voltage to be held constant over a wide range of loads. This feature is made possible in that the amplitudes of the consecutive current pulses may be adjusted directly and independently of each other. Hence, additional equipment for pre-control (of the intermediate circuit voltage) is not necessary.

The converter operates with approximately square wave currents and a defined pulse duty factor.

In this case the parasitic elements of the high voltage transformer are exploited in a targeted manner.

The converter can be employed as an anode current supply for electrical ion propulsion systems in systems with regulated (that is, in the steady state case almost constant) bus voltage. This converter is insensitive to impedance variations of the propulsion system. In addition, owing to a comparatively low current load on the components and owing to the reduction in filter components it is possible to achieve a high specific power.

As a result, in particular the following advantages can be achieved:

1. The waveform of the input current and the output current consists of current pulses that are lined up in close succession. Thus, one can manage with very low capacitance and inductance values for the input and output filters.

2. The ripple of the input current and the output current does not increase as the switching frequency decreases. Therefore, the switching frequency can be set low without having to increase the size of the filter components and the storage chokes. Thus, the frequency dependent losses can be significantly reduced.

3. As a result of the low harmonic factor of the current, the resistive losses and the core losses of the storage chokes are reduced.

4. The transmission function of the converter consists of a low pass filter of first order, the cut-off frequency of which is only slightly load dependent.

REFERENCE NUMERALS AND SYMBOLS $I_{ZK}$, $I_S$, $I_R$, $I_K$, $I_L$, $I_{CF}$ Current flow in the intermediate circuit, of the storage inductance, of the transformer secondary side, of the auxiliary inductance, of the load, in the smoothing filter

| | |
|---|---|
| $V_{ZK}$ | intermediate circuit voltage |
| $S_A$, $S_B$, $S_C$, $S_D$ | switch |
| $L_S$ | storage inductance, storage choke |
| $V_B$, $V_D$ | voltage by way of the switches $S_B$ and/or $S_D$ |
| $C_B$, $C_D$ | capacitance parallel to the switches $S_B$ and/or $S_D$ |
| HVT | high voltage transformer |
| $D_Y$, $D_X$ | first and second diode in the diode branch of the bridge |
| $L_K$ | auxiliary inductance |
| $C_R''$, $C_R'$ | winding capacitance, auxiliary capacitance |
| $C_R$ | reflected total capacitance |
| D1, D2, D3, D4 | diodes in the bridge rectifier |
| $C_F$ | capacitance in the smoothing filter |
| $R_L$ | load resistance |
| $V_{OUT}$ | output voltage |
| $I_\alpha$ | couple-current intensity, knee point current |
| $t_c$ | control time |
| $t_d$ | delay time |
| D | pulse duty factor |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A converter for an ion propulsion system, comprising:
a bridge circuit with a first and second bridge circuit connection, the bridge circuit comprising four switches, each having a first and second connection, the first connection of a first and third switch respectively being connected to the first bridge circuit connection, the second connection of the first switch being connected to the first connection of a second switch, the second connection of the third switch being connected to the first connection of a fourth switch, and the second connection of the second and fourth switch respectively being connected to the second bridge circuit connection;
a storage inductance and a high voltage transformer with a primary and a secondary winding, the primary winding and the storage inductance being connected in series with the second connection of the first switch and the first connection of the fourth switch, and the secondary winding being connected to an output of the converter;
an auxiliary inductance connected between the primary winding of the high voltage transformer and the first connection of the fourth switch; and
a switch control unit, which opens or closes the fourth switch at a control time that is delayed in relation to opening or closing of the first switch.

2. The converter, as claimed in claim 1, wherein the switch control unit opens or closes the third switch at an additional control time delayed in relation to opening or closing the second switch.

3. The converter, as claimed in claim 1 wherein the converter includes two diodes, the cathode of the first diode being connected between the primary winding of the high voltage transformer and the first connection of the fourth switch, and the anode of the diode being connected to the second bridge circuit connection, and the cathode of the second diode being connected to the first bridge circuit connection, and the anode of the second diode being connected between the primary winding and the first connection of the fourth switch.

4. The converter, as claimed in claim 1, wherein one capacitance is respectively connected between the first and second connections of the second and fourth switch.

5. The converter, as claimed in claim 4, wherein one diode is respectively connected between the first and second connections of all switches.

6. The converter, as claimed in claim 1, wherein the switches are MOSFET transistors.

7. A converter for an ion propulsion system, comprising:
a bridge circuit with a first and second bridge circuit connection, the bridge circuit comprising four switches, each having a first and second connection, the first connection of a first and third switch respectively being connected to the first bridge circuit connection, the second connection of the first switch being connected to the first connection of a second switch, the second connection of the third switch being connected to the first connection of a fourth switch, and the second connection of the second and fourth switch respectively being connected to the second bridge circuit connection;
a storage inductance and a high voltage transformer with a primary and a secondary winding, the primary winding and the storage inductance being connected in series with the second connection of the first switch and the first connection of the fourth switch, and the secondary winding being connected to an output of the converter; and
a switch control unit, which opens or closes the fourth switch at a control time that is delayed in relation to opening or closing of the first switch, wherein a capacitance is connected in parallel to the secondary winding of the high voltage transformer.

8. The converter, as claimed claim 1, wherein the switch control unit determines the control time in such a manner that it corresponds to no more than one-tenth of the period of time that elapses between an opening and closing of the same switch.

9. The converter, as claimed in claim 1, wherein the switch control unit closes, following a delay time, the second switch when the first switch was opened, or opens the second switch when the first switch was closed, and closes the third switch when the fourth switch was opened, and opens the third switch when the fourth switch was closed.

10. The converter, as claimed in claim 1, wherein while the converter is operating, the switch control unit holds open and closes all of the switches for the same amount of time within a tolerance range of five percent.

11. The converter, as claimed in claim 1, wherein the switch control unit uses, in the event of a repeated opening of the fourth switch upon opening the first switch, a control time that is different from the preceding opening of the fourth switch.

12. The converter, as claimed in claim 1, wherein the switch control unit opens or closes the third switch, when a current has reached the zero value due to the auxiliary inductance.

13. A method for a converter of an ion propulsion system that includes a bridge circuit with a first and second bridge circuit connection, the bridge circuit comprising four switches, each having a first and second connection, the first connection of a first and third switch respectively being connected to the first bridge circuit connection, the second connection of the first switch being connected to the first connection of a second switch, the second connection of the third switch being connected to the first connection of a fourth switch, and the second connection of the second and fourth switch respectively being connected to the second bridge circuit connection, and a storage inductance and a high voltage transformer with a primary and a secondary winding, the primary winding and the storage inductance being connected in series with the second connection of the first switch and the first connection of the fourth switch, and the secondary winding being connected to an output of the converter, the method comprising:

opening or closing the fourth switch at a control time that is delayed in relation to the opening or closing of the first switch; and opening or closing the third switch at an additional control time delayed in relation to opening or closing the second switch.

14. The method, as claimed claim 13, wherein the switch control unit determines the control time in such a manner that it corresponds to no more than one-tenth of the period of time that elapses between an opening and closing of the same switch.

15. The method, as claimed claim 13, wherein the switch control unit closes, following a delay time, the second switch when the first switch was opened, or opens the second switch when the first switch was closed, and closes the third switch when the fourth switch was opened, and opens the third switch when the fourth switch was closed.

16. The method, as claimed claim 13, wherein while the converter is operating, the switch control unit holds open and closes all of the switches for the same amount of time within a tolerance range of five percent.

17. The method, as claimed claim 13, wherein the switch control unit uses, in the event of a repeated opening of the fourth switch upon opening the first switch, a control time that is different from the preceding opening of the fourth switch.

18. The method, as claimed claim 13, wherein the switch control unit opens or closes the third switch, when a current has reached the zero value due to the auxiliary inductance.

\* \* \* \* \*